US010555346B2

(12) United States Patent
Wang et al.

(10) Patent No.: US 10,555,346 B2
(45) Date of Patent: Feb. 4, 2020

(54) METHOD FOR CONFIGURING PHYSICAL CHANNEL, BASE STATION AND USER EQUIPMENT

(71) Applicant: SHARP KABUSHIKI KAISHA, Sakai, Osaka (JP)

(72) Inventors: Feng Wang, Shanghai (CN); Renmao Liu, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/110,373

(22) PCT Filed: Jan. 4, 2015

(86) PCT No.: PCT/CN2015/070039
§ 371 (c)(1),
(2) Date: Jul. 7, 2016

(87) PCT Pub. No.: WO2015/103952
PCT Pub. Date: Jul. 16, 2015

(65) Prior Publication Data
US 2016/0338110 A1   Nov. 17, 2016

(30) Foreign Application Priority Data

Jan. 10, 2014   (CN) .......................... 2014 1 0012249

(51) Int. Cl.
*H04W 74/08*   (2009.01)
*H04L 1/18*    (2006.01)
(Continued)

(52) U.S. Cl.
CPC ....... *H04W 74/0833* (2013.01); *H04L 1/1825* (2013.01); *H04W 72/0446* (2013.01); *H04W 72/042* (2013.01); *H04W 88/08* (2013.01)

(58) Field of Classification Search
CPC ... H04W 16/26; H04W 74/00; H04W 74/002; H04W 74/006; H04W 74/008; H04W 74/08; H04W 74/0833
See application file for complete search history.

(56) References Cited

U.S. PATENT DOCUMENTS

2014/0098761 A1* 4/2014 Lee .................... H04W 74/006
                                                       370/329
2015/0016312 A1* 1/2015 Li ..................... H04W 74/0833
                                                       370/280

(Continued)

FOREIGN PATENT DOCUMENTS

CN   103209062 A   7/2013
CN   103378939 A   10/2013

OTHER PUBLICATIONS

LG Electronics, "Further Consideration Points for Provison of MTC UEs", 3GPP TSG RAN WG1 #73 R1-132234; Fukuoka, Japan, May 20-24, 2013.

*Primary Examiner* — Ashley Shivers
(74) *Attorney, Agent, or Firm* — Birch, Stewart, Kolasch & Birch, LLP

(57) ABSTRACT

The present disclosure provides a method performed by a User Equipment (UE). The method comprises: monitoring a physical channel that is transmitted repetitively at a repetition level; and receiving configuration information for reconfiguring the repetition level. The initial repetition level is determined during a random access procedure. The present disclosure also provides a method performed by a base station, as well as a base station and a UE. With the present disclosure, it is possible to improve resource utilization and spectrum/energy efficiency of MTC UEs supported by the LTE and reduce inter-cell time/frequency resource collisions.

4 Claims, 4 Drawing Sheets

(51) Int. Cl.
*H04W 72/04* (2009.01)
*H04W 88/08* (2009.01)

(56) References Cited

U.S. PATENT DOCUMENTS

| | | |
|---|---|---|
| 2015/0078264 A1* | 3/2015 | Han .................. H04W 74/0833 370/329 |
| 2015/0103768 A1 | 4/2015 | Chen et al. |
| 2016/0127918 A1* | 5/2016 | Yi ....................... H04W 84/047 370/329 |
| 2016/0165640 A1* | 6/2016 | Yang .................... H04W 4/005 370/336 |
| 2016/0227580 A1* | 8/2016 | Xiong ............... H04W 36/0055 |
| 2016/0242203 A1* | 8/2016 | You ......................... H04W 4/70 |

* cited by examiner

METHOD FOR CONFIGURING PHYSICAL CHANNEL, BASE STATION AND USER EQUIPMENT

TECHNICAL FIELD

The present disclosure relates to wireless communication technology, and more particularly, to a method for configuring a physical channel, a base station and a user equipment.

BACKGROUND

The Long Term Evolution (LTE) system deployed by the $3^{rd}$ Generation Partner Project (3GPP) is intended to provide increasingly diversified mobile communication services in the future. Wireless cellular communications have become an essential part of people's lives and work. In the first release (Release 8) of the 3GPP LTE, Orthogonal Frequency Division Multiple Access (OFDMA) and Multiple Input Multiple Output (MIMO) techniques have been introduced. After evaluation and test by International Telecommunication Union (ITU), the 3GPP Release 10 has been established as the $4^{th}$ generation global mobile communication standard, known as LTE-Advanced. In the LTE-Advanced standard, Carrier Aggregation (CA) and relay techniques have been introduced to improve uplink (UL)/downlink (DL) MIMO technique while supporting heterogeneous network (HetNet) deployment.

In order to meet the market demand on home device communications and the deployment of a huge-scale Internet of Things (IoT) in the future, the 3GPP has decided to introduce a low-cost Machine Type Communication (MTC) technique in the LTE and its further evolution, to transfer MTC services from the current GSM network to the LTE network and define a new type of User Equipment (UE), referred to as Low-cost MTC UE. Such UE can support MTC services in all duplex modes in the current LTE network and has: 1) one single receiving antenna; 2) a maximum Transport Block Size (TBS) of 1000 bits in UL/DL; and 3) a reduced baseband bandwidth of DL data channel of 1.4 MHz, a bandwidth of DL control channel identical to the system bandwidth of the network layer, and the same UL channel bandwidth and DL Radio Frequency (RF) part as UEs in the current LTE network.

The MTC is a data communication service without human involvement. A large-scale deployment of MTC UEs can be applied to various fields such as security, tracking, payment, measurement, consumer electronics, and in particular to applications such as video surveillance, supply chain tracking, intelligent metering and remote monitoring. The MTC requires low power consumption and supports low data transmission rate and low mobility. Currently, the LTE system is mainly designed for Human-to-Human (H2H) communication services. Hence, in order to achieve the scale benefit and application prospect of the MTC services, it is important for the LTE network to support the low-cost MTC devices to operate at low cost.

Some MTC devices are mounted in basements of residential buildings or locations protected by insulating films, metal windows or thick walls of traditional buildings. These devices will suffer significantly higher penetration loss in air interface than conventional device terminals, such as mobile phones and tablets, in the LTE network. The 3GGP has started researches on solution designs and performance evaluations for the LTE network to provide the MTC devices with a 20 dB of additional coverage enhancement. It is to be noted that an MTC device located in an area with poor network coverage has a very low data transmission rate, a very loose delay requirement and a limited mobility. For these MTC characteristics, some signaling and/or channels of the LTE network can be further optimized to support the MTC. The 3GPP requires providing the newly defined low cost UEs and other UEs running MTC services (e.g., with very loose delay requirements) with a certain level of LTE network coverage enhancement. In particular, a 15 dB of network coverage enhancement is provided in the LTE Frequency Division Duplex (FDD) network. Additionally, not all UEs running MTC services need the same network coverage enhancement.

For the new low-cost MTC devices, in the DL, the data channel is 1.4 MHz (i.e., 6 RBs) and the control channel can still access the entire DL system bandwidth in the baseband part, while the RF link part remains the same, i.e., the entire system bandwidth can be accessed. In the UL, the baseband part and the RF part both remain the same. In addition, the low-cost MTC UE has one single receiving antenna and its maximum UL transport block and DL transport block are each 1000 bits.

For 3GPP LTE UEs running MTC services in the coverage enhancement mode, the design and configuration of coverage enhancement for physical channels (such as EPDCCH/PDSCH/PUCCH/PUSCH) need to be standardized. According to the discussions in the 3GPP RAN1 #74 meeting, after completion of the initial access, the configuration mode of any physical channel that requires repetitive transmission is decided at the base station. In the discussions in the 3GPP RAN1 #75 meeting, for an MTC UE in the coverage enhancement mode, its UE specific search space supports PDSCH scheduled by (E)PDCCH and supports a number of repetitive transmission levels for (E)PDCCH. From the perspective of UE, the potential start subframe of the repetitive transmission of (E)PDCCH should be limited to a certain set of subframes. The LTE does not support periodical repetitive transmission of CSI in PUCCH, but supports repetitive transmission of ACK/NACK in PUCCH and a number of repetitive transmission levels for PDSCH/PUSCH in time domain.

Further, when a UE in the coverage enhancement mode runs an MTC application service, the (E)PDCCH/PDSCH/PUCCH/PUSCH requires repetitive transmission in a number of subframes. There is a need for solution of problems regarding how to configure a start subframe number of a channel with coverage enhancement and the number of repetition for the channel in this case, and how to determine a timing relation between channels.

SUMMARY

In order to solve the above problems, the present disclosure provides a method network configuration for transmitting/receiving mechanisms of a physical channel (such as (E)PDCCH/PDSCH/PUCCH/PUSCH) for an MTC UE (a low cost UE or another UE that supports delay-tolerant MTC services and require a certain amount of coverage enhancement), and a timing relation between channels.

According to the present disclosure, a repetition level, a start subframe number, a number of repetitions, a time-frequency resource used, or a timing relation for a physical channel (such as (E)PDCCH/PDSCH/PUCCH/PUSCH) can be configured semi-statically based on a coverage enhancement level of an MTC UE as determined during a random access procedure. The semi-statically configured repetition level of physical channel can be configured per physical channel, or one single channel can be selected as a reference configuration and a mapping relation between any other channel and the selected channel can be defined.

In particular, in an aspect of the present disclosure, a method performed by a User Equipment (UE) is provided. The method comprises: monitoring a physical channel that is transmitted repetitively at a repetition level; and receiving configuration information for reconfiguring the repetition level, wherein the initial repetition level is determined during a random access procedure.

In an embodiment, the configuration information for reconfiguring the repetition level comprises at least one of: a repetition level of the physical channel, a start subframe number, a number of repetitions, a time-frequency resource used, and a timing relation.

In an embodiment, the physical channel comprises at least one of: a Physical Downlink Control Channel (PDCCH), a Physical Downlink Shared Channel (PDSCH), a Physical Random Access Channel (PRACH), a Physical Uplink Control Channel (PUCCH), and a Physical Uplink Shared Channel (PUSCH).

In an embodiment, the configuration information associated with each physical channel is configured via Radio Resource Control (RRC) signaling.

In an embodiment, a particular physical channel is selected as a reference channel for which the configuration information is configured via RRC signaling, and a mapping relation between any other physical channel and the reference channel is defined.

In an embodiment, the reference signal comprises a Physical Downlink Control Channel (PDCCH).

In an embodiment, the configuration information for reconfiguring the repetition level comprises a number of repetitions, and a start subframe number is determined based on the number of repetitions and a number of subframes available for transmitting the physical channel within a transmission period.

In an embodiment, a timing relation for the physical channel is predetermined or configured semi-statically via RRC signaling.

In another aspect of the present disclosure, a method performed by a base station is provided. The method comprises: transmitting a physical channel that is transmitted repetitively at a repetition level; and configuring configuration information for reconfiguring the repetition level, wherein the initial repetition level is determined during a random access procedure.

In an embodiment, the configuration information for reconfiguring the repetition level comprises at least one of: a repetition level of the physical channel, a start subframe number, a number of repetitions, a time-frequency resource used, and a timing relation.

In an embodiment, the physical channel comprises at least one of: a Physical Downlink Control Channel (PDCCH), a Physical Downlink Shared Channel (PDSCH), a Physical Random Access Channel (PRACH), a Physical Uplink Control Channel (PUCCH), and a Physical Uplink Shared Channel (PUSCH).

In an embodiment, the configuration information associated with each physical channel is configured via Radio Resource Control (RRC) signaling.

In an embodiment, a particular physical channel is selected as a reference channel for which the configuration information is configured via RRC signaling, and a mapping relation between any other physical channel and the reference channel is defined.

In an embodiment, the reference signal comprises a Physical Downlink Control Channel (PDCCH).

In an embodiment, the configuration information for reconfiguring the repetition level comprises a number of repetitions, and a start subframe number is determined based on the number of repetitions and a number of subframes available for transmitting the physical channel within a transmission period.

In an embodiment, a timing relation for the physical channel is predetermined or configured semi-statically via RRC signaling.

In another aspect of the present disclosure, a User Equipment (UE) is provided. The UE comprises: a monitoring unit configured to monitor a physical channel that is transmitted repetitively at a repetition level; and a receiving unit configured to receive configuration information for reconfiguring the repetition level, wherein the initial repetition level is determined during a random access procedure.

In an embodiment, the configuration information for reconfiguring the repetition level comprises at least one of: a repetition level of the physical channel, a start subframe number, a number of repetitions, a time-frequency resource used, and a timing relation.

In an embodiment, the physical channel comprises at least one of: a Physical Downlink Control Channel (PDCCH), a Physical Downlink Shared Channel (PDSCH), a Physical Random Access Channel (PRACH), a Physical Uplink Control Channel (PUCCH), and a Physical Uplink Shared Channel (PUSCH).

In an embodiment, the configuration information associated with each physical channel is configured via Radio Resource Control (RRC) signaling.

In an embodiment, a particular physical channel is selected as a reference channel for which the configuration information is configured via RRC signaling, and a mapping relation between any other physical channel and the reference channel is defined.

In an embodiment, the reference signal comprises a Physical Downlink Control Channel (PDCCH).

In an embodiment, the configuration information for reconfiguring the repetition level comprises a number of repetitions, and a start subframe number is determined based on the number of repetitions and a number of subframes available for transmitting the physical channel within a transmission period.

In an embodiment, a timing relation for the physical channel is predetermined or configured semi-statically via RRC signaling.

In another aspect of the present disclosure, a base station is provided. The base station comprises: a transmitting unit configured to transmit a physical channel that is transmitted repetitively at a repetition level; and a configuring unit configured to configure configuration information for reconfiguring the repetition level, wherein the initial repetition level is determined during a random access procedure.

In an embodiment, the configuration information for reconfiguring the repetition level comprises at least one of: a repetition level of the physical channel, a start subframe number, a number of repetitions, a time-frequency resource used, and a timing relation.

In an embodiment, the physical channel comprises at least one of: a Physical Downlink Control Channel (PDCCH), a Physical Downlink Shared Channel (PDSCH), a Physical Random Access Channel (PRACH), a Physical Uplink Control Channel (PUCCH), and a Physical Uplink Shared Channel (PUSCH).

In an embodiment, the configuration information associated with each physical channel is configured via Radio Resource Control (RRC) signaling.

In an embodiment, a particular physical channel is selected as a reference channel for which the configuration information is configured via RRC signaling, and a mapping relation between any other physical channel and the reference channel is defined.

In an embodiment, the reference signal comprises a Physical Downlink Control Channel (PDCCH).

In an embodiment, the configuration information for reconfiguring the repetition level comprises a number of repetitions, and a start subframe number is determined based on the number of repetitions and a number of subframes available for transmitting the physical channel within a transmission period.

In an embodiment, a timing relation for the physical channel is predetermined or configured semi-statically via RRC signaling.

With the present disclosure, it is possible to improve resource utilization and spectrum/energy efficiency of MTC UEs supported by the LTE and reduce inter-cell time/frequency resource collisions.

BRIEF DESCRIPTION OF THE DRAWINGS

The above and other objects, features and advantages will be more apparent from the following description of embodiments with reference to the figures, in which.

DETAILED DESCRIPTION

The embodiments of the present disclosure (in particular, a method for transmitting/receiving (E)PDCCH, a base station and a UE for low cost UEs that may or may not require additional coverage enhancement or other UEs that support delay-tolerant MTC services and require a certain amount of coverage enhancement) will be detailed below with reference to the drawings. It should be noted that the following embodiments are illustrative only, rather than limiting the scope of the present disclosure. In the following description, details of well known techniques which are not directly relevant to the present invention will be omitted so as not to obscure the concept of the invention.

In the following, a number of embodiments of the present invention will be detailed in an exemplary application environment of LTE mobile communication system and its subsequent evolutions. Herein, it is to be noted that the present invention is not limited to the application exemplified in the embodiments. Rather, it is applicable to other communication systems, such as the future 5G cellular communication system.

Figure 1:
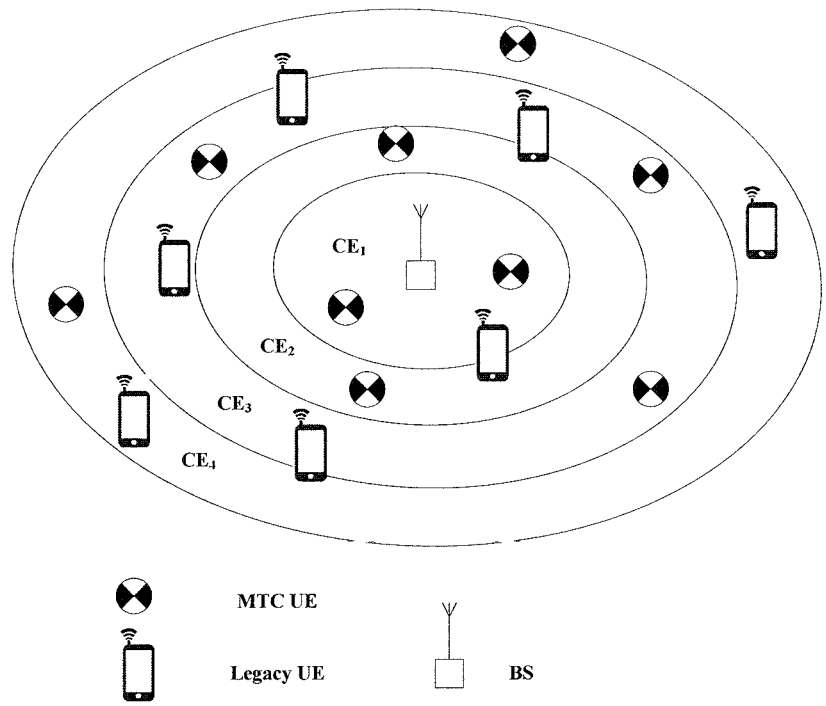
FIG. 1 is a schematic diagram showing a location distribution of MTC UEs in an LTE cell.

FIG. 1 shows a distribution of MTC UEs in an LTE cell. The cell is divided into M=4 coverage enhancement level regions, $CE_1, \ldots, CE_4$. Accordingly, four groups of PRACH preamble sequences are required. Here, the MTC UEs at the edge of the cell experience the most significant channel fading (this region has the highest coverage enhancement level) and requires the highest amount of time-frequency resources for their UL/DL physical channels. In particular, the numbers of (E)PDCCH/PDSCH/PUSCH repetitions are all associated with $CE_x$, where $x=1, \ldots, L$ and L is the number of coverage enhancement levels divided in the cell.

Figure 2:
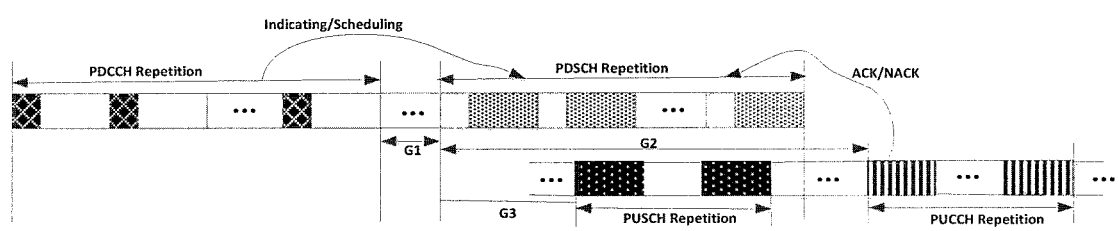
FIG. 2 is a schematic diagram showing a timing relation between physical channels according to the present disclosure.

FIG. 2 shows a timing relation between physical channels, such as (E)PDCCH, PDSCH, PUCCH and PUSCH, in the coverage enhancement mode. A UE-specific Search Space (USS) in (E)PDCCH supports PDSCH resources scheduled by (E)PDCCH. In this case, the (E)PDCCH and its scheduled PDSCH are transmitted separately. That is, the repetitive transmission of the (E)PDCCH is completed before the transmission of its scheduled PDSCH. In the uplink, an ACK/NACK associated with the PDSCH is transmitted over PUCCH in a timeslot after completion of the transmission of PDSCH. The transmission and indication of the PUSCH is configured by the (E)PDCCH and thus, in the timing sequence, the PUSCH needs to be transmitted after completion of the transmission of the (E)PDCCH.

Figure 3:
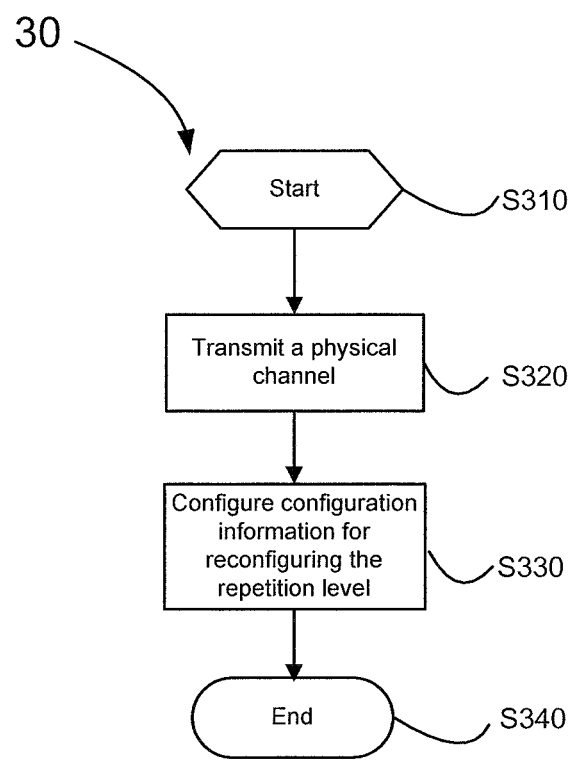
FIG. 3 is a flowchart illustrating a method performed by a base station according to an embodiment of the present disclosure.

FIG. 3 is a flowchart illustrating a method performed by a base station according to an embodiment of the present disclosure. As shown in FIG. 3, the method 30 starts with step S310.

At step S320, a physical channel is transmitted. The physical channel is transmitted repetitively at a repetition level.

At step S330, configuration information is configured for reconfiguring the repetition level. The initial repetition level is determined during a random access procedure. For example, the configuration information for reconfiguring the repetition level may include at least one of: a repetition level of the physical channel, a start subframe number, a number of repetitions, a time-frequency resource used, and a timing relation.

In an embodiment, the physical channel may include at least one of: a Physical Downlink Control Channel ((E)PDCCH), a Physical Downlink Shared Channel (PDSCH), a Physical Random Access Channel (PRACH), a Physical Uplink Control Channel (PUCCH), and a Physical Uplink Shared Channel (PUSCH).

The signaling configuration for the repetition levels of (E)PDCCH/PDSCH/PUCCH/PUSCH can be implemented in two exemplary schemes as shown in Table 1 below.

TABLE 1

Repetition Configuration Schemes for Physical Channels

| Repetition Configuration Scheme for Physical Channels | PRACH | (E)PDCCH | PDSCH | PUCCH | PUSCH |
|---|---|---|---|---|---|
| Scheme 1 | X0 | x | y | z | w |
| Scheme 2 | X0 | x | x + n1 | x + n2 | x + n3 |

Note 1:
The repetition configuration includes at least one of: repetition level, start subframe, no. of repetitions, and time-frequency resources used.
Note 2:
The number of repetition levels for PRACH is relatively small, but a larger number of repetition levels can be configured for (E)PDCCH/PDSCH/PUCCH/PUSCH.
Note 3:
In Scheme 1, x, y, z and w are configured independently from each other. In Scheme 2, a mapping relation {n1, n2, n3} between the repetition configuration for (E)PDCCH and any other channel is required.

That is, in Scheme 1, the configuration information associated with each physical channel is configured via Radio Resource Control (RRC) signaling. In Scheme 2, a particular physical channel is selected as a reference channel for which the configuration information is configured via RRC signaling, and a mapping relation between any other physical channel and the reference channel is defined. In this way, the UE can derive the repetition level configurations and the used time-frequency resources of other channels based on the configuration of the reference channel.

For example, the reference signal comprises a Physical Downlink Control Channel ((E)PDCCH). In this case, the configuration information for Physical Downlink Shared Channel (PDSCH) can be configured: semi-statically via RRC/MAC signaling, based on a predefined mapping relation between PDSCH and (E)PDCCH, or via Downlink Control Information (DCI).

In an embodiment, the start subframe number can be determined based on the number of repetitions and a number of subframes available for transmitting the physical channel within a transmission period. For example, given a repetition level, assuming that the number of repetitions for the physical channel ((E)PDCCH/PDSCH/PUCCH/PUSCH) is N1 and the number of subframes in each radio frame available for repetitively transmitting the physical channel within a transmission period is N2, the start subframe of the physical channel is at a subframe having a subframe number k1~kn (where n could be 1) within a radio frame having SFN mod (ceiling (N1/N2))=0. Here the subframe number k1~kn can be fixed or can be configured semi-statically via RRC signaling. Further, it can be predetermined or configured semi-statically whether a subframe supports a UE in the network coverage enhancement mode.

In an embodiment, a timing relation for the physical channel is predetermined or configured semi-statically via RRC signaling. For example, given a repetition level, assuming that the last subframe for the (E)PDCCH repetitions is x, then the start subframe for the PDSCH repetitions is x+G1, the start subframe for the PUCCH repetitions is x+G2, and the start subframe for the PUSCH repetitions is x+G3, where G1, G2 and G3 are numbers of subframes each having a value larger than or equal to 0. The value of each of G1, G2 and G3 can be predetermined or can be configured semi-statically via RRC signaling. The default start subframe for the (E)PDCCH repetitions is #0, and the subframes #0/4/5/9 always support the repetitive transmission of (E)PDCCH/PDSCH. It can be configured semi-statically via RRC signaling, or predetermined, whether other subframes support the repetitive transmission of (E)PDCCH/PDSCH.

Finally, the method 30 ends at step S340.

Figure 4:
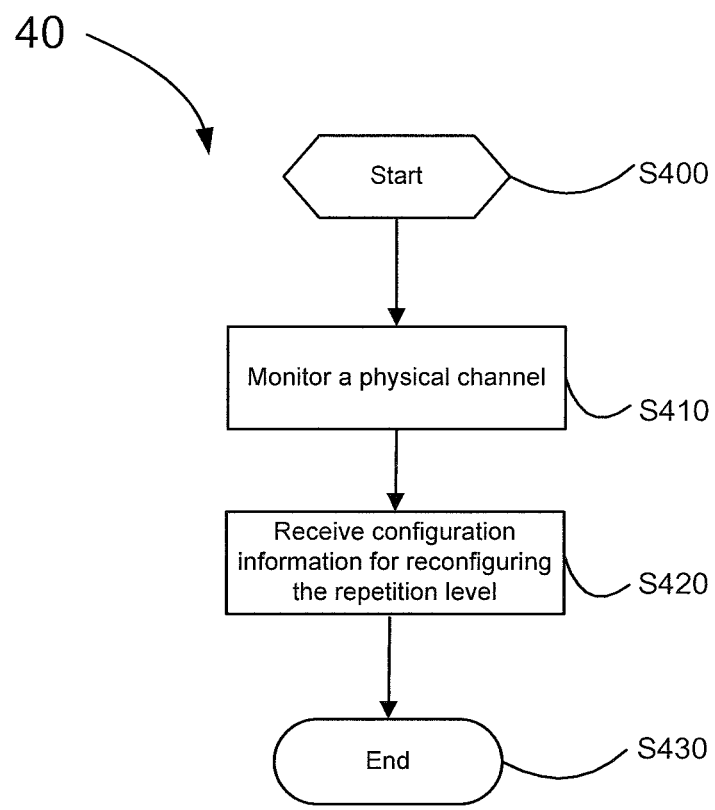
FIG. 4 is a flowchart illustrating a method performed by a UE according to an embodiment of the present disclosure.

FIG. 4 is a flowchart illustrating a method performed by a UE according to an embodiment of the present disclosure. As shown in FIG. 4, the method 40 starts with step S400.

At step S410, a physical channel is monitored. The physical channel is transmitted repetitively at a repetition level.

In an embodiment, the physical channel may include a Physical Downlink Control Channel ((E)PDCCH) and a Physical Downlink Shared Channel (PDSCH). Before receiving the physical channel repetition level configured via RRC signaling, the UE can monitor reception and demodulation of the physical channel based on at least one of: a predefined mode, a new content added to Msg4 during a random access procedure, configuration information about a number of repetitions of Random Access Responses (RARs), and a System Information Block (SIB). In particular, before receiving the repetition level configuration signaling for a physical channel, the UE needs to demodulate the (E)PDCCH and its scheduled PDSCH in order to obtain the radio link layer control (i.e., RRC) signaling. More specifically, there can be several schemes.

In the first scheme, the UE can monitor (E)PDCCH/PDSCH based on a predefined (E)PDCCH/PDSCH configuration mode, so as to receive the RRC signaling. It is to be noted that the (E)PDCCH/PDSCH configuration here may have the highest repetition level, or a repetition level selected by the UE during an initial random access procedure.

In the second scheme, the UE can monitor (E)PDCCH/PDSCH based on a new content added to Msg4 during the random access procedure. The Msg4 can be used for transferring the repetition level configuration of (E)PDCCH/PDSCH.

In the third scheme, the UE can monitor (E)PDCCH/PDSCH based on a number of repetitions of Random Access Responses (RARs) from the base station. Information about the number of RAR repetitions can be added to a Medium Access Control (MAC) PDU for transferring a repetition level configuration for the physical channel.

In the fourth scheme, the configuration information for (E)PDCCH/PDSCH can be added to a System Information Block (SIB). The UEs in the coverage enhancement mode within a cell can have the same repetition level.

At step S420, configuration information for reconfiguring the repetition level is received. The initial repetition level is determined during a random access procedure. For example, when the signaling for the repetition level configuration of the physical channel is read by the UE, the UE updates the repetition level configuration of the physical channel and monitors (E)PDCCH/PDSCH and other physical channels with that repetition level. The configuration information for reconfiguring the repetition level may include at least one of: a repetition level of the physical channel, a start subframe number, a number of repetitions, a time-frequency resource used, and a timing relation.

Finally, the method 40 ends at step S430.

Figure 5:
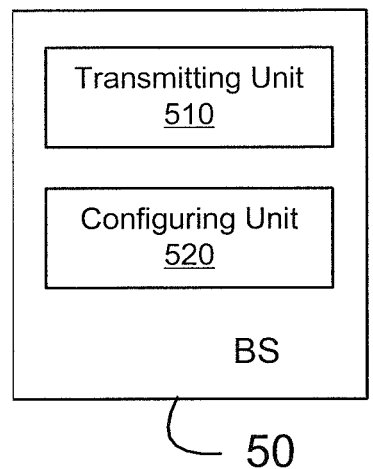
FIG. 5 is a block diagram of a base station according to an embodiment of the present disclosure.

FIG. 5 is a block diagram of a base station according to an embodiment of the present disclosure. As shown in FIG. 5, the base station 50 includes a transmitting unit 510 and a configuring unit 520.

The transmitting unit 510 is configured to transmit a physical channel that is transmitted repetitively at a repetition level.

The configuring unit 520 is configured to configure configuration information for reconfiguring the repetition level. The initial repetition level is determined during a random access procedure. For example, the configuration information for reconfiguring the repetition level may include at least one of: a repetition level of the physical channel, a start subframe number, a number of repetitions, a time-frequency resource used, and a timing relation.

In an embodiment, the physical channel may include at least one of: a Physical Downlink Control Channel (PDCCH), a Physical Downlink Shared Channel (PDCCH), a Physical Random Access Channel (PRACH), a Physical Uplink Control Channel (PUCCH), and a Physical Uplink Shared Channel (PUSCH).

In an embodiment, the configuring unit 520 can be configured to configure the configuration information associated with each physical channel via Radio Resource Control (RRC) signaling.

Alternatively, the configuring unit 520 can select a particular physical channel as a reference channel, configure the configuration information for the reference channel via RRC signaling, and define a mapping relation between any other physical channel and the reference channel. Preferably, the reference signal comprises a Physical Downlink Control Channel (PDCCH).

In an embodiment, the configuring unit 520 can determine a start subframe number based on a number of repetitions and a number of subframes available for transmitting the physical channel within a transmission period.

In an embodiment, the configuration unit 520 can predetermine, or configure semi-statically via RRC signaling, a timing relation for the physical channel.

Figure 6:
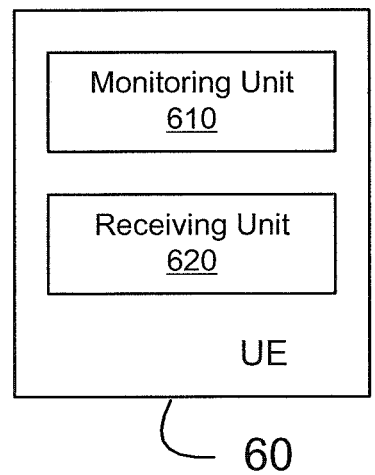
FIG. 6 is a block diagram of a UE according to an embodiment of the present disclosure.

FIG. 6 is a block diagram of a UE according to an embodiment of the present disclosure. As shown in FIG. 6, the UE 60 includes a monitoring unit 610 and a receiving unit 620.

The monitoring unit 610 is configured to monitor a physical channel that is transmitted repetitively at a repetition level. The physical channel can include at least one of: a Physical Downlink Control Channel (PDCCH), a Physical Downlink Shared Channel (PDSCH), a Physical Random Access Channel (PRACH), a Physical Uplink Control Channel (PUCCH), and a Physical Uplink Shared Channel (PUSCH).

The receiving unit 620 is configured to receive configuration information for reconfiguring the repetition level. The initial repetition level is determined during a random access procedure. For example, the configuration information for reconfiguring the repetition level can include at least one of: a repetition level of the physical channel, a start subframe number, a number of repetitions, a time-frequency resource used, and a timing relation.

The present disclosure provides a solution for a base station to transmit the repetition configuration information for the physical channel of a serving cell, so as to be read by a UE in the coverage enhancement mode. With the present disclosure, it is possible to improve resource utilization and spectrum/energy efficiency of MTC UEs supported by the LTE and reduce inter-cell time/frequency resource collisions.

It can be appreciated that the above embodiments of the present disclosure can be implemented in software, hardware or any combination thereof. For example, the internal components of the base station and the UE in the above embodiments can be implemented using various devices including, but not limited to, analog circuit device, digital circuit device, Digital Signal Processing (DSP) circuit, programmable processor, Application Specific Integrated Circuit (ASIC), Field Programmable Gate Array (FPGA), Programmable Logic Device (CPLD) and the like.

In the present disclosure, the term "base station" means a mobile communication data and control exchange center with a large transmit power and a wide coverage area and including functions such as resource allocation/scheduling, data reception/transmission and the like. The term "user equipment" means a user mobile terminal, including e.g., a mobile phone, a notebook computer and other terminal devices that can wirelessly communicate with a base station or and micro base station.

Further, the embodiments of the present disclosure can be implemented in computer program products. More specifically, a computer program product can be a product having a computer readable medium with computer program logics coded thereon. When executed on a computing device, the computer program logics provide operations for implementing the above solutions according to the present disclosure. When executed on at least one processor in a computing system, the computer program logics cause the processor to perform the operations (methods) according to the embodiments of the present disclosure. This arrangement of the present disclosure is typically provided as software, codes and/or other data structures provided or coded on a computer readable medium (such as an optical medium, e.g., CD-ROM, a floppy disk or a hard disk), or firmware or micro codes on other mediums (such as one or more ROMs, RAMs or PROM chips), or downloadable software images or shared databases in one or more modules. The software, firmware or arrangement can be installed in a computing device to cause one or more processors in the computing device to perform the solutions according to the embodiments of the present disclosure.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached and the equivalents thereof.

The invention claimed is:

1. A User Equipment (UE), comprising:
a processor, and
non-transitory memory in electronic communication with the processor, wherein instructions stored in the memory are executable by the processor to:
    determine a repetition level of a Physical Downlink Control Channel (PDCCH) for Random Access Response (RAR) based on a coverage enhancement level for a Physical Random Access Channel (PRACH),
    determine a starting subframe for the PDCCH based on the coverage enhancement level, and
    monitor the PDCCH based on the repetition level and the starting subframe,
wherein the repetition level is determined initially during a random access procedure.

2. A Base Station (BS) apparatus, comprising:
a processor, and
non-transitory memory in electronic communication with the processor, wherein instructions stored in the memory are executable by the processor to:
    determine a repetition level of a Physical Downlink Control Channel (PDCCH) for Random Access Response (RAR) based on a coverage enhancement level for a Physical Random Access Channel (PRACH),
    determine a starting subframe for the PDCCH based on the coverage enhancement level, and
    transmit the PDCCH based on the repetition level and the starting subframe,
wherein the repetition level is determined initially during a random access procedure.

3. A method of a User Equipment (UE), comprising:
determining a repetition level of a Physical Downlink Control Channel (PDCCH) for Random Access Response (RAR) based on a coverage enhancement level for a Physical Random Access Channel (PRACH),
determining a starting subframe for the PDCCH based on the coverage enhancement level, and
monitoring the PDCCH based on the repetition level and the starting subframe, wherein the repetition level is determined initially during a random access procedure.

4. A method of a Base Station (BS) apparatus, comprising:

determining a repetition level of a Physical Downlink Control Channel (PDCCH) for Random Access Response (RAR) based on a coverage enhancement level for a Physical Random Access Channel (PRACH), determining a starting subframe for the PDCCH based on the coverage enhancement level, and transmitting the PDCCH based on the repetition level and the starting subframe wherein the repetition level is determined initially during a random access procedure.

* * * * *